United States Patent [19]
Bender et al.

[11] Patent Number: 5,557,285
[45] Date of Patent: Sep. 17, 1996

[54] GIMBAL CONTROL SYSTEM

[75] Inventors: Douglas J. Bender, Redondo Beach; Stuart F. Bockman, Torrance; Bruce N. Eyerly, Torrance; John J. Anagnost, Torrance, all of Calif.

[73] Assignee: Hughes Electronics, Los Angeles, Calif.

[21] Appl. No.: 185,346

[22] Filed: Jan. 24, 1994

[51] Int. Cl.$^6$ ................................................ H01Q 3/00
[52] U.S. Cl. ........................ 342/359; 343/757; 342/358
[58] Field of Search ...................... 342/358, 359, 342/75, 77, 420, 74, 76; 343/757, 754, 758, 760; 244/164

[56] References Cited

U.S. PATENT DOCUMENTS

| | | | |
|---|---|---|---|
| 4,084,159 | 4/1978 | Anderson et al. | 342/359 |
| 4,090,201 | 5/1978 | Whitman, Jr. | 342/359 |
| 4,118,705 | 10/1978 | Varley | 342/359 |
| 4,148,029 | 4/1979 | Quesinberry | 342/106 |
| 4,743,909 | 5/1988 | Nakamura et al. | 342/359 |
| 5,062,592 | 11/1991 | Kishimoto | 244/164 |
| 5,241,319 | 8/1993 | Shimizu | 342/359 |
| 5,269,483 | 12/1993 | Flament | 244/164 |
| 5,274,382 | 12/1993 | Wills et al. | 342/359 |
| 5,420,597 | 5/1995 | Duncan | 343/703 |

FOREIGN PATENT DOCUMENTS

| | | |
|---|---|---|
| 0522930 | 7/1991 | European Pat. Off. |
| 2647238 | 4/1989 | France |

OTHER PUBLICATIONS

Elgersma, M., et al.; "Robust Controllers for Space Station Momentum Management"; Proceedings of the 30th IEEE Conference on Decision and Control; 11 Dec. 1991; vol. 3; pp. 2206–2212.

Busing, J. A., et al.; "Attitude Acquisition and Tracking Capabilities of the Instrument Pointing System"; SPIE Conference on Acquisition, Tracking and Pointing; Apr. 1986; vol. 641; pp. 54–65.

Clarke, E. S., et al.; "Acquisition and Tracking System for a Ground–Based Laser Communications Receiver Terminal"; SPIE Control and Communication Technology in Laser Systems; 1981; vol. 295; pp. 162–169.

*Primary Examiner*—Gregory C. Issing
*Attorney, Agent, or Firm*—Elizabeth E. Leitereg; Terje Gudmestad; W. K. Denson-Low

[57] ABSTRACT

A multi-loop control system for a gimballed antenna that employs devices for measuring both absolute line-of-sight (an autotrack receiver or beacon tracker) and relative angular position (a resolver). The control system uses both signals simultaneously, thereby increasing the performance and pointing accuracy capability. Two control loops operate simultaneously to provide for optimum performance. The first loop is an inner high-bandwidth control loop that uses the relative gimbal angle measurement to control pointing of the antenna along a precommanded profile. The inner loop may run alone to provide for coarse pointing. When available, the line-of sight measurement is used in a low-bandwidth outer loop to provide corrections to the command profile of the inner loop. Control logic is provided that allows switching between several control modes. By using the present invention, antenna tracking control performance is maximized, especially in the presence of attitude disturbances of a spacecraft or significant flexible interactions.

18 Claims, 4 Drawing Sheets

GIMBAL CONTROL SYSTEM

BACKGROUND

The present invention relates generally to gimbal control systems, and more particularly, to a gimbal control system that employs inner and outer control loops.

Conventional systems for spacecraft antenna control do not simultaneously use autotrack and resolver references. Many systems do not have resolvers at all and in the absence of autotrack sensor signals steer the antenna by open-loop counting of steps. Conventional antenna control systems that use resolvers for closed-loop control of gimbal position in the absence of an autotrack signal would, upon detection of the autotrack signal, commence to use that signal exclusively; that is, they would either use the autotrack or the resolver reference, but not together. This limits system performance by not using all the available sensor information.

Heretofore, a variety of gimbal control systems have been developed for use in controlling the pointing direction of satellite antennas. For example, a gimbal control system employed on the MILSTAR spacecraft has resolvers and autotrack receivers. However, they use one or the other, never both at the same time. The current-generation TDRSS satellite uses an autotrack receiver as a pointing reference for its gimbal. However, it does not have a resolver. When performing "program track" (or open-loop) pointing, it keeps track of the antenna's position by counting motor steps. Gross updates of the antenna's position are available from potentiometers, but are not used in any closed-loop algorithms. Satellites such as INTELSAT VI or AUSSAT-B use ground-based beacons as pointing references for their antennas. These beacon tracking systems are much like the TDRSS design, in that they do not have a resolver but keep track of antenna position by counting steps.

Other gimbal systems with very high performance requirements (such as those developed for laser pointing) often have a highly accurate high bandwidth sensor such as a gyro on the payload (i.e., mounted on the object that is steered by the gimbal). In these cases, that sensor (the gyro or other sensor on the payload) is the primary or only sensor used to control the gimbal. The gyro may be supplemented with a lower-bandwidth target tracking loop. This is the opposite of the design concept of the present invention, where a payload-mounted sensor is only used to provide low-bandwidth correction to a control loop using the resolver.

U.S. Pat. No. 5,062,592, granted to H. Kishimoto, issued Nov. 5, 1991, entitled "Orientation Control Apparatus for Space Vehicle", describes a spacecraft with a gimballed antenna. The antenna has an RF autotrack sensor to sense its inertial position. There is also a rate sensor for sensing the rate of the spacecraft main body (not the antenna), and both sensors are used simultaneously for controlling the antenna gimbal. This differs from the present invention because there is no sensor (such as a resolver) for measuring the relative orientation between the spacecraft and the antenna.

A number of papers relating to control of gimballed payloads have been presented at the annual SPIE Conference on Acquisition, Tracking, and Pointing. For example, a paper entitled "Design and Performance of a Satellite Laser Communications Pointing System," by R. Deadrick, Proc. 8th Annual Rocky Mountain Conference, Keystone, Colo., 1985, is an example of numerous papers that describe gimbal control systems with both resolvers and sensors for measuring payload pointing (quadrant detector in this case), but both sensors are not utilized simultaneously: the resolver is used only in acquisition mode, and the quadrant detector is used only in track mode. Another paper entitled "Acquisition and Tracking System for a Ground-Based Laser Communications Receiver Terminal," E. Clark & H. Brixley, SPIE Vol. 295, Control and Communication Technology in Laser Systems, 1981, pp. 162–169 describes a similar system.

A paper entitled "Attitude Acquisition and Tracking Capabilities of the Instrument Pointing System," by J. Busing and P. Urban, in the First SPIE Conference on Acquisition, Tracking and Pointing, April 1986, describes a control system for a gimballed telescope which simultaneously uses gyros, optical sensors, resolvers, and accelerometers. The optical sensor is used to calibrate gyro rate drifts, and thus the gyro is an inherent part of this control system. The detailed control architecture is not shown.

A paper entitled "Azimuth/Elevation Servo Design of the W. M. Keck Telescope," by M. Sirota and P. Thompson, in the Second SPIE Conference on Acquisition, Tracking and Pointing, January 1988, describes a system for controlling a gimballed telescope with simultaneous feedback of accelerometer, tachometer, and encoder measurements. No optical or RF reference is used.

A paper entitled "The Enhancement of Armored Vehicle Fire Control (Stationary and Fire-on-the-Move) Performance Using Modern Control Techniques," J. Groff, presented at the Third SPIE Conference on Acquisition, Tracking and Pointing, March, 1989, describes a system for controlling a gun turret using (simultaneously) a gyro, a tachometer, a potentiometer, and an optical gimbal angle encoder. The control compensation and architecture appear to be significantly different and more complicated than the present invention.

A paper entitled "A Low-Cost Alternative to Gyroscopes for Tracking System Stabilization," by D. Laughlin et al., in the Fourth SPIE Conference on Acquisition, Tracking and Pointing, April 1990, describes a gimbal control system using a gyro or magnetohydrodynamic device mounted on the payload for measuring angular rate, and closing a high-bandwidth inner "stabilization" feedback control loop, and simultaneously using an optical or RF sensor for closing a low bandwidth outer "track" feedback control loop. No resolver or other relative angle sensor is used. Several other papers describing the same configuration are found in the SPIE conference proceedings.

A paper entitled "A New Generation Control System for Ultra-Low Jitter Satellite Tracking," by W. Verbanets and D. Greenwald, in the Fifth SPIE Conference on Acquisition, Tracking and Pointing, April 1991, describes a gimbal system with simultaneous feedback of accelerometer and position encoder measurements. The compensation is different from the present invention and no inertial optical or RF sensor is employed.

A paper entitled "Optimization of Gimbal Scanned Infrared Seeker," by E. Williams, R. Evans, K. Brant, and L. Stockum in the Fifth SPIE Conference on Acquisition, Tracking and Pointing, April 1991, describes a control system for a seeker that simultaneously uses resolver and gyro feedback. However, the paper does not describe the control compensation.

A paper entitled "Universal Beam Steering Mirror Using the Cross Blade Fixture," by M. Meline, J. Harrell, and K. Lohnes, presented at the Sixth SPIE Conference on Acquisition, Tracking and Pointing, April 1992 includes a block diagram of a system for controlling a gimballed mirror which has an inner control loop using a measurement of the relative angle between the mirror and the basebody. However, this feedback loop has a lower bandwidth than the main outer optical control loop and has the express purpose of canceling the mirror control motor's back EMF, but does not provide any control of the mirror angle beyond that.

While several of the control systems for gimbals described above share certain characteristics with the present system, all of them are different in some fundamental way. The fundamental characteristics of the present system that do not appear in any of these papers are: (1) the simultaneous use of gimbal position measurements relative to both the spacecraft and the target (i.e., resolver and optical or RF tracking sensor measurements); the systems in the published references either do not use these measurements simultaneously, or use some other combination of measurements; and (2) the control filtering used to combine these measurements to account for biases between a programmed (open-loop) command reference and the measured target position from the optical or RF tracking sensor.

Accordingly, it is an objective of the present invention to provide for a gimbal control system that simultaneously uses measurements of relative and inertial gimbal position and a control filtering scheme to combine these measurements to account for biases between the programmed (open-loop) command reference and the measured target position from the optical or RF tracking sensor.

SUMMARY OF THE INVENTION

The present invention is a control system for a gimballed antenna that employs devices for measuring the absolute line-of-sight of the antenna (provided by an autotrack receiver or beacon tracker) and the relative angular position of the antenna (provided by a resolver). The gimbal control system uses both signals simultaneously, thereby increasing the performance and pointing accuracy capability. There are two control loops that operate simultaneously to provide for optimum performance. The first or inner loop is a high-bandwidth control loop that uses the relative gimbal angle measurement to control the antenna pointing along a pre-commanded profile. The inner loop may run alone to provide for coarse pointing. When available, the line-of-sight measurement is used in a low-bandwidth outer loop to provide corrections to the command profile of the inner loop. Control logic is provided that takes advantage of the control loop structure to allow switching between several control modes. By using the present invention, antenna tracking control performance is maximized, especially in the presence of attitude disturbances of the spacecraft or significant flexible interactions.

The present two-loop control system is especially valuable in cases where a control loop using one of the sensors has an inherently limited bandwidth. For example, in some cases the autotrack sensor creates a relatively noisy but accurate measurement of the absolute inertial position of the target and a control loop using just the autotrack sensor would have a limited bandwidth. The bandwidth of an autotrack loop is also limited if there is significant flexibility in the structure between the gimbal and the antenna where the autotrack sensor measurement is taken, or if the gimballed inertia interacts with the spacecraft structural dynamics. In either of these cases, it is advantageous to use the autotrack sensor to provide a low-bandwidth correction to the high-bandwidth inner control loop that uses the resolver as is provided in the present invention.

Another advantage of using the resolver measurement even when the autotrack reference is available is that resolver feedback enables improved damping of gimbal flexibility. This enables a lighter-weight gimbal with less stiffness to provide an equivalent performance capability.

As spacecraft antenna pointing requirements become more stringent due to increased communication bandwidths, it will become more important to have antenna control systems with the highest possible performance and pointing accuracy. The present system provides improved performance by using all available information from the resolver and autotrack receiver in the spacecraft to control antenna pointing. Also, including the resolver in the feedback control system at all times makes the system less susceptible to missed steps in a stepper motor gimbal. This is important because, as step sizes become smaller, stepper drive motors are more likely to miss steps.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
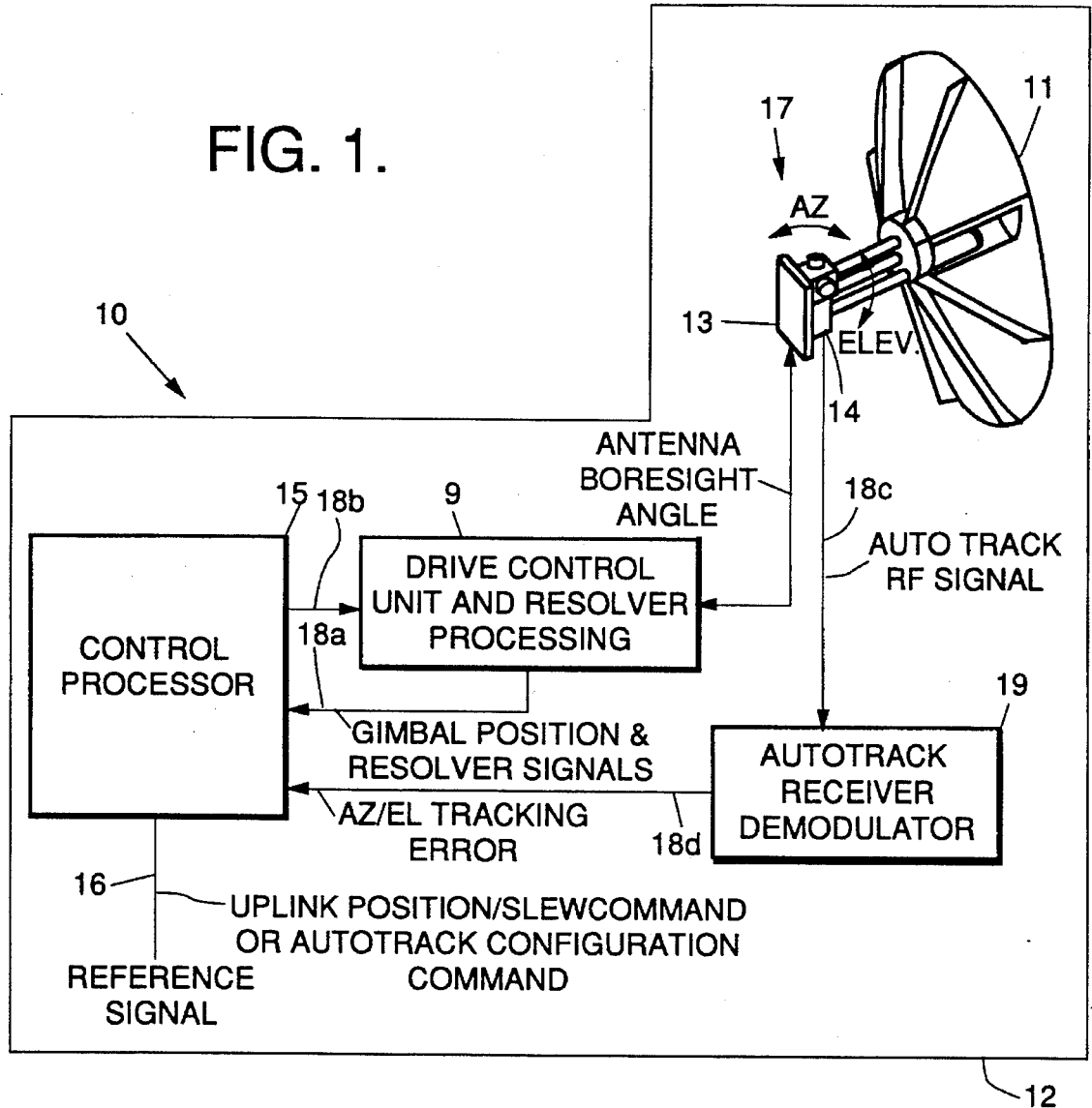
FIG. 1 illustrates a gimbal drive system that employs a gimbal control system in accordance with the principles of the present invention.

Referring to the drawing figures, FIG. 1 depicts a gimbal control system 10 in accordance with the principles of the present invention that is adapted to steer an antenna 11 that is mounted on a gimbal 13. In the illustrative embodiment of FIG. 1, the gimbal 13 and the antenna 11 are disposed on a spacecraft 12. The gimbal 13 may be either a stepped or direct ("continuous") drive design. The gimbal 13 is typically a two-axis gimbal, but in certain cases may have one or three controlled axes. A typical example of a stepper-motor driven gimbal 13 is shown in FIG. 1.

The gimbal 13 includes an accurate, low-noise measuring device for measuring the relative angular position of the gimbal 13 and producing a relative position angle measurement signal 18a. This device is typically a resolver 14, but an inductosyn or an optical encoder may also be employed. The relative position signal 18a is indicative of the position error of the gimbal 13 and is typically resolved into two mutually orthogonal components (azimuth and elevation) by the resolver 14. Given that the antenna 11 and gimbal 13 are mounted on the spacecraft 12, the resolver 14 measures the relative angle between the spacecraft 12 and the antenna 11 pointing direction. The relative angle data, along with data indicative of the attitude of the spacecraft 12, determines the pointing direction of the antenna 11 in inertial space. Azimuth and elevation actuators 17 are disposed on the gimbal 13 and are used to move the antenna 11 to its commanded position.

The spacecraft 12 includes a receiver signal processor 19 for receiving and electronically processing a communications signal 18c defining antenna 11 angular position error relative to an absolute reference. Typically, this reference is the desired pointing direction of the antenna 11, and may be generated on the earth or on another cooperating satellite with which the spacecraft 12 communicates (known as a crosslink). The signal processor 19 is commonly part of or ancillary to the main communication receiving electronics of the spacecraft 12. The drive control and resolver processing unit 9 produces gimbal position and resolver signals 18a that are applied to the gimbal control processor 15. The control processor creates gimbal commands 18b that are executed by the drive control and resolver processing unit 9.

In one commonly used design, the received communications signal is used for the pointing reference (typically in a noncoherent receiver), and an autotrack receiver is used to extract the azimuth and elevation error signals. In another commonly used design, some part of the received communications signal is used to create a position reference signal, and the receiver is coherent. This position reference signal is a reference beacon and the electronics that decodes the azimuth and elevation error signals forms a beacon tracker. Other types of sensors that perform this function include: laser communication devices, quadrant detectors, or a payload which derives its own line-of-sight measurement, for example, using an optical telescope.

The drive control and resolver processing unit 9 is coupled between the control processor 15 and the gimbal 13. A receiver demodulator 19 is coupled between the antenna 11 and the control processor 15. The receiver demodulator is adapted to demodulate an autotrack RF signal 18c and produce azimuth and elevation tracking error signals 18d that are processed by the control processor 15.

Figure 2:
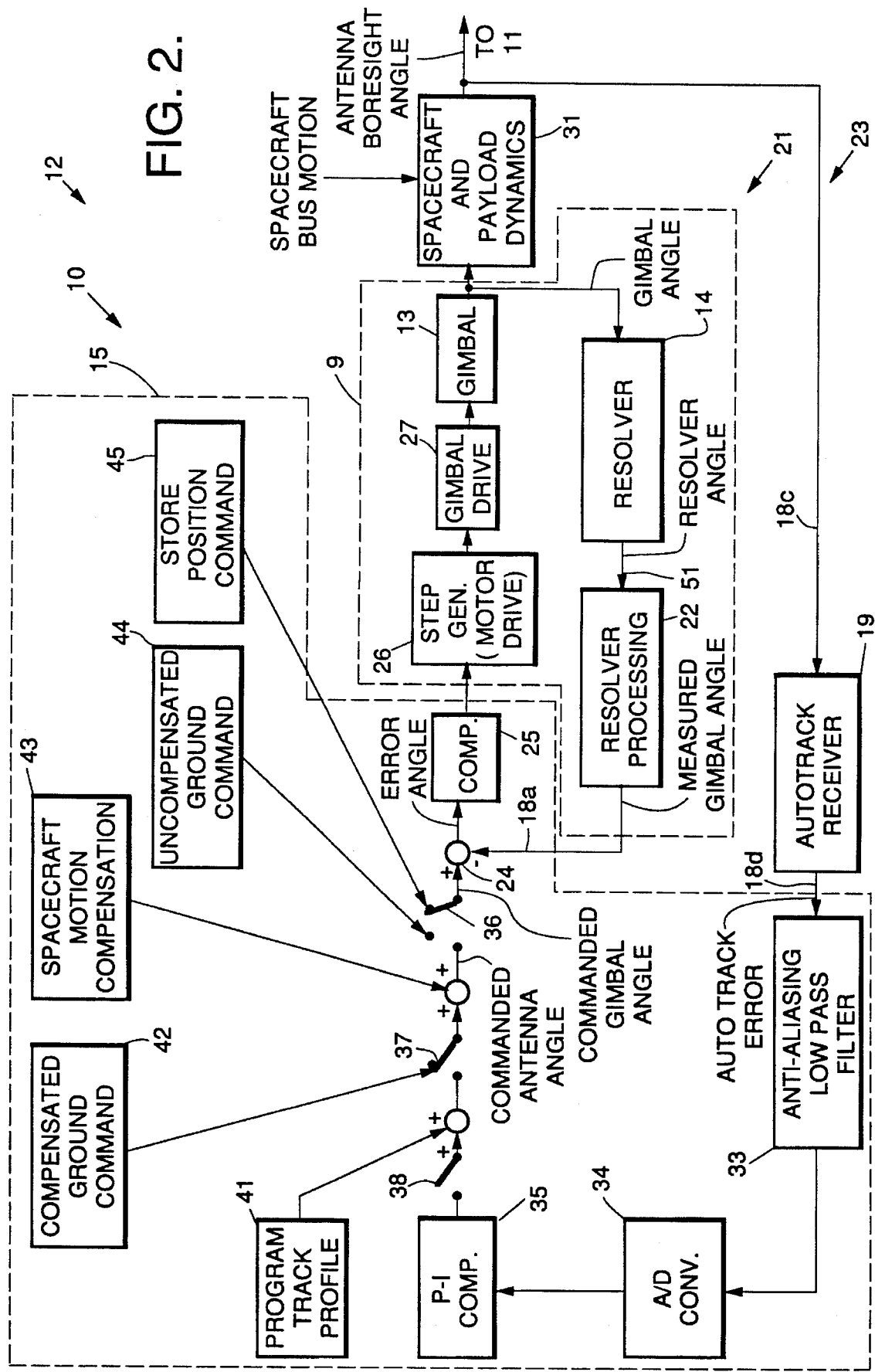
FIG. 2 is a block diagram illustrating the details of the gimbal control system in accordance with the principles of the present invention.

FIG. 2 is a detailed block diagram of the gimbal control system 10, which employs an outer control loop 23, and an inner control loop 21 that includes the resolver 14. More particularly, the gimbal control system 10 of FIG. 2 is used to control one axis of the gimbal 13. The gimbal control system 10 for the other axis is similar or substantially identical to the gimbal control system 10 shown in FIG. 2.

The inner control loop 21 is comprised of the resolver 14 and a resolver processing circuit 22. The resolver 14 is adapted to provide an output signal 51 indicative of gimbal angles relative to the spacecraft 12. The resolver processing circuit 22 is adapted to process the resolver measurement and provide an output signal 18a indicative of the relative angular position of the antenna 11 (the measured gimbal angle). The inner control loop 21 also comprises a compensation circuit 25, a step generator 26, or motor driver 26, that is adapted to generate step commands, and a gimbal drive 27 that produces a desired gimbal angle signal that drives the gimbal 13.

The gimbal motion, along with spacecraft bus motion, is coupled to the spacecraft and payload dynamics. The inertial orientation of the antenna boresight is a consequence of the spacecraft and payload dynamics. The output of the spacecraft dynamics 31 is processed by an autotrack receiver 19 which produces an autotrack error signal 18d. The autotrack error signal is processed by an anti-aliasing filer 33 and then digitized in an analog-to-digital converter 34. The output of the analog-to-digital converter 34 is applied to a P-I (proportional-integral) compensation circuit 35. First second and third switches 36, 37, 38, are serially coupled between the P-I compensation circuit 35 and the summing device 24. Various command signals that are determinative of control modes provided by the gimbal control system 10 are shown coupled to selected terminal of the switches 36, 37, 38 and include a program track profile 41, a compensated ground command 42, a spacecraft motion compensation signal 43, uncompensated ground command 44, and a store position command 45.

The gimbal control system 10 uses the measurement provided by the resolver 14 for feedback control, and the inner control loop 21 is always active. The inner control loop 21 is a servo loop that controls the antenna 11 to a commanded orientation with respect to the spacecraft 12. The measurement provided by the resolver 14 is processed by a resolver processing circuit 22 and is compared with a commanded gimbal angle in a summing device 24. The error between the measurement provided by the resolver 14 and the commanded gimbal angle is provided as an error output signal from the summing device 24. The error signal is processed by a compensation circuit 25, optionally filtered by an optional digital or analog filter 28 (shown in FIGS. 3 and 4), and then processed by a step generator 26 or motor driver 26 to provide a step rate command for a stepping gimbal 13 or a torque command for a direct-drive gimbal 13. The step command is then sent to gimbal drive 27.

The resolver feedback signal provided by the resolver 14 provides a measurement of the relative angle between the spacecraft 12 and the gimballed antenna 11. This allows for stabilization of gimbal compliance by phase-lead compensation. In theory, derivative feedback may increase the damping of a flexible mode to any desired value. This allows for at least one or two flexible modes to be within the bandwidth of the gimbal control system 10 and therefore a higher-bandwidth gimbal control system 10 may be designed. Thus, even if the gimbal 13 is significantly flexible, an accurate high-bandwidth measurement of the gimbal angle enables improved performance, and more accurate control of the antenna 11. Since a stiffer gimbal drive tends to be heavier, the use of the resolver 14 enables antenna 11 control accuracy to be maintained with a lighter weight gimbal 13.

Figure 3:
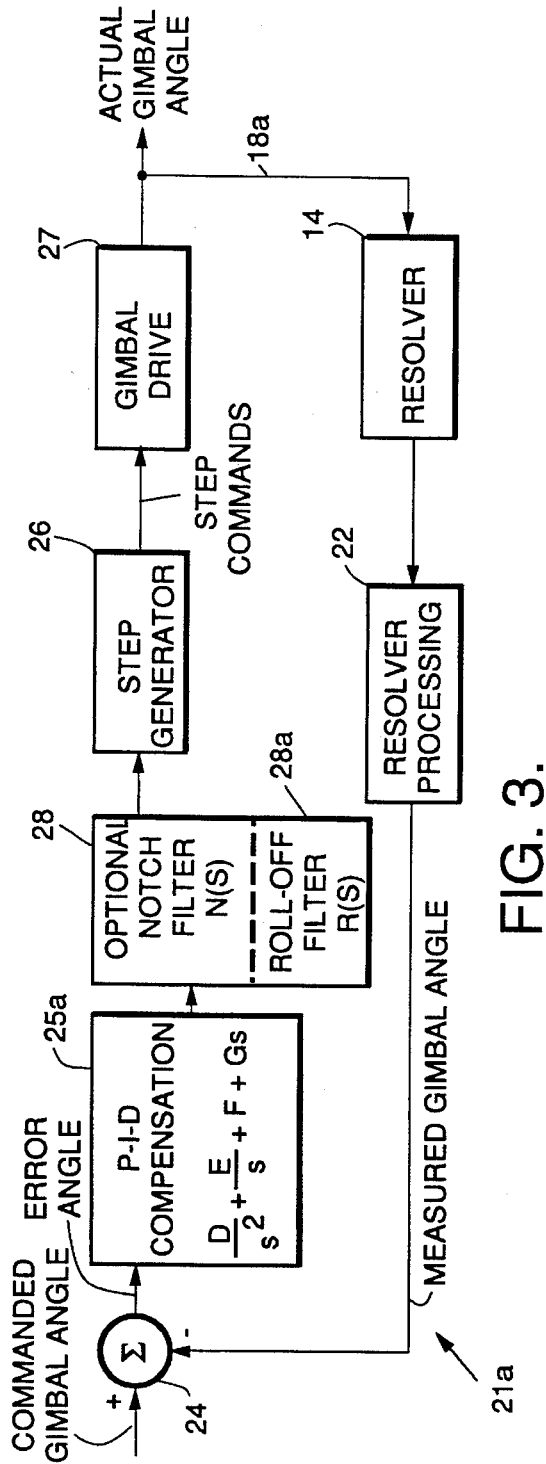
FIG. 3 is a block diagram illustrating compensation for a stepper drive gimbal that may be employed in the gimbal control system of FIG. 2.

If the gimbal 13 is driven by a stepper motor, for example, the drive motor causes the gimbal 13 to move exactly to the commanded position. Ignoring flexible modes, the transfer function of the gimbal dynamics is unity. The purpose of feedback control in this case is to use the measurement provided by the resolver 14 to enable the gimbal 13 to track the position command, expressed in degrees of angle instead of relative step counts. In the stepper drive case, and in the preferred implementation, the inner control loop 21a (or compensation loop 21) is as shown in FIG. 3. FIG. 3 is a block diagram illustrating an inner control loop 21a (compensation loop 21) for a stepper drive gimbal 13 that may be employed in the gimbal control system 10 of FIG. 2.

The compensation provided by the inner control loop 21a includes a proportional-double-integrator-derivative (PIID) compensation device 25a that provides for tracking of a commanded position that has a "ramp" characteristic (i.e., a moving target with equation of time $a_0+a_1 t$) with no steady-state error. The double integrator compensation device 25a has the added benefits of filtering high-frequency noise and flexible dynamics. The inner control loop 21a also includes the optional notch filter 28 that provides phase lead or a derivative feedback term to stabilize the closed-loop control system 10, and an optional roll-off filter 28a to stabilize flexible modes in the gimbal 13 or antenna 11.

In one possible implementation, the inner control loop 21 outputs a stepping rate command, and the motor drive electronics (which may include a numerically controlled oscillator) integrates this command to derive individual step commands. The inner control loop 21 may be implemented using either analog or digital electronics, or a microprocessor.

Figure 4:
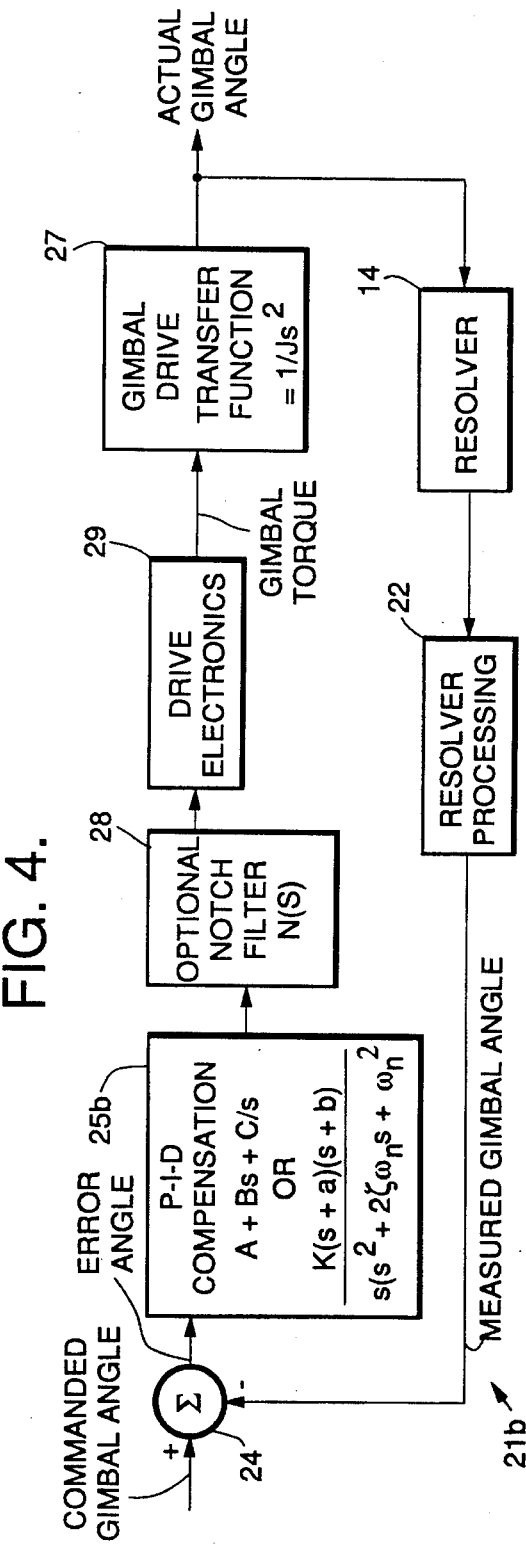
FIG. 4 is a block diagram illustrating compensation for a direct drive gimbal that may be employed in the gimbal control system of FIG. 2.

If the gimbal 13 is driven by a continuous-drive motor, the inner control loop 21b as shown in FIG. 4 may be employed. FIG. 4 is a block diagram illustrating the inner control loop 21b for a direct drive gimbal 13 that may be employed in the gimbal control system 10 of FIG. 2. In this case, the double integrator characteristic required for the inner control loop 21b to be able to track a ramp input is inherent in the gimbal dynamics. The inner control loop 21b comprises a PID (proportional-integrator-derivative) type integrator 25b as is shown in FIG. 4. This inner control loop 21b allows the control system 10 to achieve zero steady-state error in the presence of constant or slowly-varying friction in the gimbal 13. As before, the inner control loop 21b may also include a notch filter 28 or additional phase lead to stabilize flexible modes in the gimbal 13 or antenna 11, and may be implemented with either analog or digital electronics, or a microprocessor.

Referring again to FIG. 2, possible gimbal control modes using resolver feedback will now be discussed. By changing the position of the switches 36, 37, 38 shown in FIG. 2, it is possible to control the antenna 11 in any of several modes. The switch positions referred to below are numbered as follows. Switch 1 (36), connects to either the Store Position Command 45 (position 1), Uncompensated Ground Command, 44 (position 2) or Spacecraft Motion Compensation, 43 (position 3). Switch 2 (37) connects to either Compensated Ground Command, 42 (position 1) or Program Track Profile, 4 (position 2). Switch 3 (38) connects either to P-I compensation, 35 (position 2) or is open (position 1). The gimbal control modes are summarized in Table 1 below.

TABLE 1

| Antenna Mode | Switch 1 (36) | Switch 2 (37) | Switch 3 (38) |
| --- | --- | --- | --- |
| Store Ground Command | Position 1 | — | — |
| uncompensated | 2 | — | — |
| compensated | 3 | 1 | — |
| Program Track (corrected) | 3 | 2 | 1 |
| Acquisition | 3 | 2 | 1 |
| Autotrack | 3 | 2 | 2 |

If the first switch 36 (switch 1) is in position 1, the antenna 11 is in a "store" mode and is steered to a predetermined desired orientation with respect to the spacecraft 12 and then left there. This position may be such as to minimize solar torques on the spacecraft 12. If the first switch 36 is in position 2, the gimbal 13 is in an "uncompensated ground command mode," and is steered to a ground-commanded desired position with respect to the spacecraft 12. If the first switch 36 is in position 3 and the second switch 37 (switch 2) is in position 1, the gimbal 13 is in a "compensated ground command mode." In this mode, the gimbal 13 is served to a desired ground-commanded inertial orientation, and spacecraft 12 motion is compensated for by adding in a signal representing the orientation of the spacecraft 12 ("spacecraft motion compensation"). The orientation of the spacecraft 12 is typically derived by sensors disposed on the spacecraft 12 (for example, star sensors or gyros). The accuracy of the control provided by this mode is limited by the accuracy of the sensors and the accuracy of knowledge of target position.

If the first switch 36 is in position 3 and the second switch 37 is in position 2, (with the third switch 38 open in position 1), the gimbal 13 is in a "corrected program track mode." This mode is similar to the compensated ground command mode, except that instead of a real-time ground commanded position, a stored commanded position profile is used. This profile may, for example, be stored in the form of a table lookup or as a polynomial function that is evaluated on the spacecraft 12. This is a "program track" mode of operation.

"Acquisition" mode is functionally equivalent to the "corrected program track mode," in that all switch positions are the same, except that a target search profile is superimposed onto the program track profile.

The inner and outer loop autotrack reference provided by the gimbal control system 10 will now be described. Assume that the gimbal control system 10 is in the corrected program track mode (i.e., the first switch 36 is in position 3, the second switch 37 is in position 2, and the third switch 38 is in position 1). If the target toward which the antenna 11 is steered is an autotracking target (i.e., if it has a communications signal that is used as an autotrack reference), then the autotrack signal strength is monitored by the autotrack receiver 19. When the autotrack signal strength has exceeded a predetermined threshold, the autotrack reference is declared present and the third switch 38 is closed (position 2). At that instant, an autotrack error signal is available for controlling the gimbal 13. As is shown in FIG. 2, the autotrack signal is a direct measurement of the boresight angle of the antenna 11 with respect to the target. The description below illustrates how the autotrack signal is used in combination with the resolver signal to control the gimbal 13.

The autotrack error signal from the autotrack receiver 19 is typically processed by a low-pass analog filter or anti-aliasing filter 33 to remove high-frequency noise. It is often the case that the autotrack receiver 19 uses analog electronics and thus the raw autotrack error signal is analog, while the remainder of the control algorithms are performed digitally. If this is the case, the autotrack error signal is digitized (A/D converted) by an A/D converter 34 prior to further processing. In this case, it is important that the analog low-pass filter 33 have its cutoff frequency set below half the sample frequency of the ND converter 34. After A/D conversion, the signal may be low-pass filtered by a second low-pass filter (not shown).

In prior art control systems, the autotrack error signal is used directly in place of the resolver signal in the gimbal control loop. The distinguishing feature of the present invention is that even when the autotrack error signal is present and is used, the resolver signal and the program track reference command are used simultaneously. How this is done is described in detail below.

In the gimbal control system 10 of the present invention, following low-pass filtering of the autotrack signal in the filter 33 and conversion to a digital signal in the A/D converter 34, it is passed through a P-I (proportional-integral) filter 35. The P-I filter 35 has a continuous-time transfer function given by $$\frac{k_2 s + k_1}{s} \text{ or } k_2 + \frac{k_1}{s}$$

The equivalent of the P-I filter 35 may be digitally implemented. The output of the P-I filter 35 is then added to the program track profile 41 following the third switch 38, and from that point the remainder of the gimbal control system 10 is as described previously, in that the third switch 38 is closed but the program track profile 41 is still used.

The combination of the anti-aliasing low-pass filter 33 and the P-I filter 35 ideally result in a low-bandwidth reference signal, in that this signal has its cutoff frequency below that of the inner-loop 21 incorporating resolver feedback used in the gimbal control system 10. In this case, the autotrack signal results in an accurate, but slowly-varying, correction to the stored program track profile 41 equal to the deviation of the actual target position from the stored program track profile. In the steady-state, the output of the P-I filter 35 is exactly this difference. In the steady-state, the input to the P-I filter 35 is zero because the closed-loop action of the two-loop gimbal control system 10 causes the antenna 11 to track exactly on the target, and the sensed autotrack error to be zero. The output of the P-I filter 35 is equal and opposite to the program track error. In the steady-state, the sum of the program track profile 41 and the output of the P-I filter 35 define the exact target position. This summed signal is the input to the inner control loop 21. As the target moves, this input signal matches the target's position with small deviations due to disturbances and noise. The inner control loop 21 servoes the gimbal 13 to track this commanded profile, and the compensation provided by the P-I filter 35 corrects the commanded profile to null the small deviations from the exact target position, resulting in exactly the gimbal motions necessary to track the target.

The benefit of using the inner control loop 21 in combination with the outer control loop 23 even after acquiring the autotrack reference signal is that the resolver is an inherently less noisy sensor than the autotrack signal and allows for a higher-bandwidth, higher-performance control system 10 than that which could be obtained using the autotrack signal 18c alone. Gimbal control may be performed with the commanded program track profile 41 as a reference to the resolver-based inner control loop 21. The inner control loop 21, along with the use of spacecraft motion compensation, tracks out most disturbances resulting from the body of the spacecraft 12 ("spacecraft bus motion"). The autotrack signal provides a low-bandwidth correction signal for the relatively fast inner control loop 21 to correct for unknown biases and unknown motions of the target.

An added benefit of using the output of the resolver 14 as the main feedback signal is that the control system 10 is less sensitive to flexibility of the gimbal 13 or antenna 11, since the resolver 14 is co-located with the gimbal 13. An alternative is to use the autotrack receiver 19 as the primary feedback sensor, augmented with feedforward of the spacecraft bus motion. This combination offers no direct measurement of gimbal deflections due to flexibility, and the control bandwidth is more limited by the need to stabilize gimbal flexible interactions. Thus, using the resolver 14 in the inner control loop 21 allows for active control of the gimbal flexible dynamics and therefore a higher-bandwidth control system 10 with the same gimbal stiffness, or an equal bandwidth control system 10 with a lighter-weight, less stiff gimbal 13. The above discussion refers to flexibility between the resolver and the autotrack sensor. Resolver feedback does not mitigate flexibility between the gimbal drive and resolver feedback (this would typically be flexibility in the gear train).

If the program track profile disappears (for example, if the commands are inadvertently exhausted), the present gimbal control system 10 still operates. Assuming that the most recent value of the program track profile 41 is stored, after the program track ceases to be updated, the output of the P-I filter 35 steadily grows to equal the difference between the current target position and the most recent value of the program track profile. Depending on how the parameters of the gimbal control system 10 are selected, it may be made to behave arbitrarily close to the behavior of a control loop with autotrack feedback alone.

Figure 5:
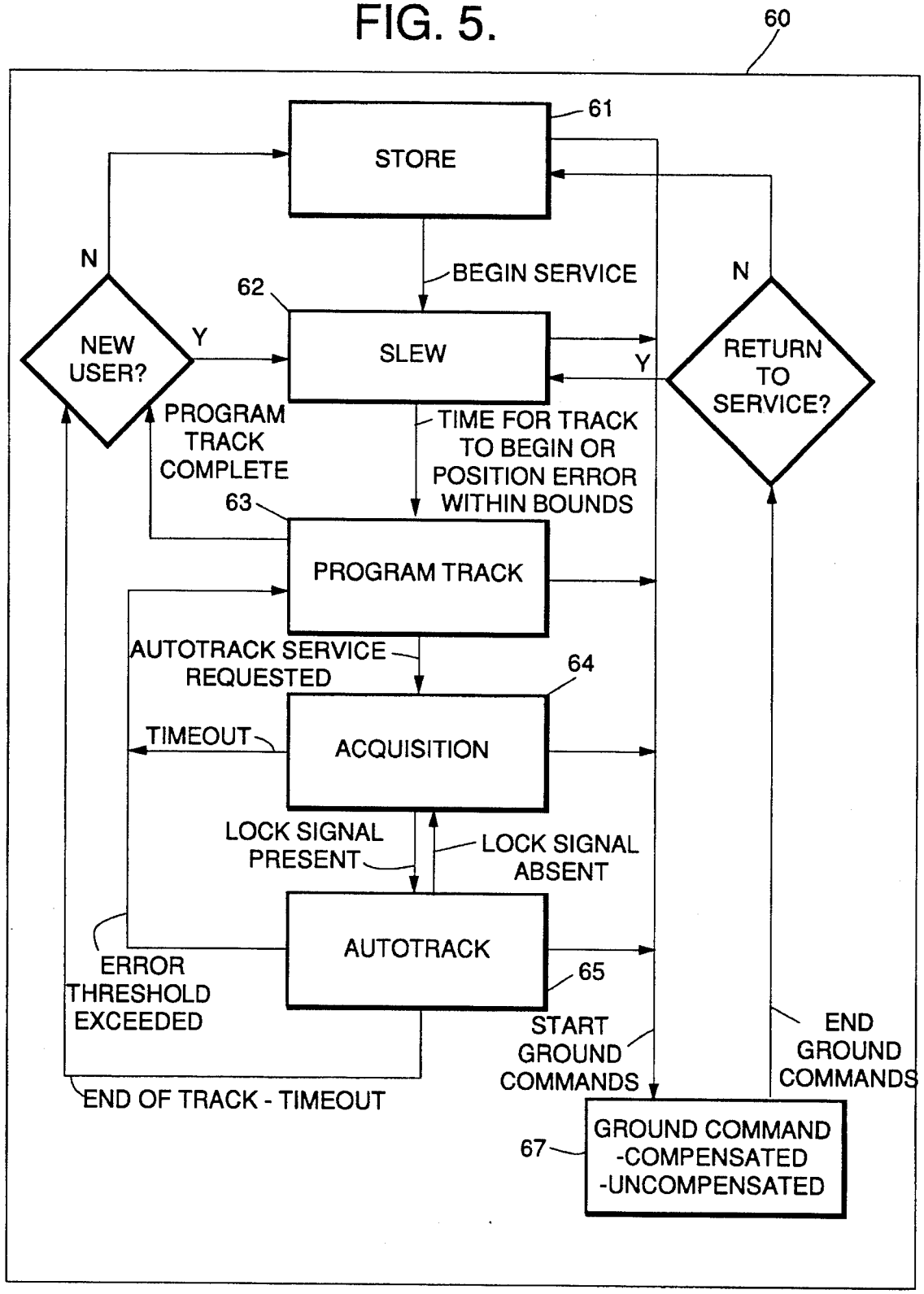
FIG. 5 is a state diagram illustrating antenna mode control used in the gimbal control system of FIG. 2.

Logic that provides for automatic mode control will now be described. FIG. 5 is a state diagram showing an example of mode control and transitioning logic 60 which may be supported by the gimbal control system 10 described herein. All but one of the antenna control modes shown in FIG. 5 are as in Table 1. "Slew" mode is a special case of program track mode, in which the antenna 11 tracks a predetermined profile using only the resolver reference but compensates for the attitude of the spacecraft 12. The slew mode is used to steer the antenna 11 over large angles to its next target, and is only different from program track mode in that the control gains may be different (typically higher). Also, as stated above, the "acquisition" mode is another special case of the program track mode, during which the autotrack electronics are searching for the autotrack signal. The acquisition mode may include a search pattern superimposed on the program track profile, and again the control gains could be different (typically higher).

FIG. 5 is believed to be relatively self-explanatory. Starting from store mode 61, upon receipt of a command to begin (or return to) service and the appropriate steering profile, the control system 10 is switched to slew mode 62. Then, when the antenna 11 has reached the nominal position of its target, the logic 60 is switched to program track mode 63. If autotrack service is requested, the electronics searches for the autotrack present signal and switches to acquisition mode 64. Upon receipt of the autotrack present signal, control is switched to autotrack mode 65. If the autotrack signal is lost, control is switched back to acquisition mode, and if the signal does not reappear within some length of time, control is switched back to program track mode 63. If the service times out, the antennas may be stopped where they are or may be commanded to store mode 61. Provision is also provided for direct ground command of the gimbal, shown as 67 in FIG. 5.

In one alternative implementation of the present invention, the spacecraft attitude is not available. This might be true, for example, if the antenna 11, the gimbal 13, and its control electronics are delivered as an independent package to be integrated with the spacecraft 12 at a later time. In this case, the best that can be done is to assume the spacecraft motions are negligible and set the spacecraft motion compensation signal of FIG. 2 to zero.

Thus there has been described a new and improved gimbal control system that employs inner and outer control loops. It is to be understood that the above-described embodiment is merely illustrative of some of the many specific embodiments which represent applications of the principles of the present invention. Clearly, numerous other arrangements can be readily devised by those skilled in the art without departing from the scope of the invention.

What is claimed is:

1. Apparatus comprising:

a spacecraft;

a gimbal disposed on the spacecraft;

an antenna disposed on the gimbal;

processing means coupled to the antenna for processing autotrack RF signals received by the antenna and for providing azimuth and elevation tracking error signals in response thereto that are indicative of the absolute line-of-sight of the antenna;

a control processor coupled to the processing means for processing position command signals and the azimuth and elevation tracking error signals, and for generating gimbal control signals for steering the antenna; and a drive control and angle position measurement processing unit coupled between the control processor and the gimbal for receiving the gimbal control signals from the control processor and for generating antenna boresight angle signals that are applied to the gimbal to steer the antenna, which processing unit comprises a gimbal control system that includes an inner feedback loop that comprises angular position means for providing signals indicative of the relative angular position of the antenna and wherein the inner feedback loop is a control loop that uses the relative gimbal angle measurement to control pointing direction of the antenna along a precommanded profile.

2. The apparatus of claim 1 wherein the angular position means comprises a resolver.

3. The apparatus of claim 1 wherein the angular position means comprises an optical encoder.

4. The apparatus of claim 1 wherein the angular position means comprises an inductosyn.

5. The apparatus of claim 1 wherein the gimbal control system further comprises a second outer feedback loop that comprises an autotrack receiver for providing signals indicative of the absolute line-of-sight of the antenna, which signals provide corrections to the command profile of the inner loop.

6. The apparatus of claim 1 wherein the angular position means comprises azimuth and elevation resolvers coupled to the gimbal for producing azimuth and elevation error signals that are indicative of the error between a commanded pointing direction and the pointing direction of the antenna.

7. The apparatus of claim 1 wherein the received position command signals comprise position and slew commands.

8. The apparatus of claim 1 wherein the received position command signals comprise autotrack configuration commands.

9. The apparatus of claim 1 wherein the processing means comprises a receiver demodulator.

10. The apparatus of claim 1 wherein the processing means comprises an optical tracker.

11. A gimbal control system comprising:

a gimbal;

an antenna disposed on the gimbal;

an autotrack receiver coupled to the antenna for processing autotrack RF signals received by the antenna to provide azimuth and elevation autotracking error signals in response thereto;

a gimbal drive circuit coupled to the gimbal for producing a desired gimbal angle signal that drives the gimbal;

a resolver control loop coupled to the gimbal for processing gimbal angle signals to produce measured gimbal angle signals;

a control processor coupled to the autotrack receiver and the resolver control loop for processing position command signals received from an external source, the gimbal angle signals derived from the resolver control loop, and the azimuth and elevation autotracking error signals provided by the autotrack receiver, for generating control signals in response thereto to position the antenna, and wherein the control processor comprises:

a compensation control loop coupled between the autotrack receiver and the gimbal drive control unit that comprises:

a proportional plus integration compensation circuit coupled to the autotrack receiver for processing the autotracking error signals and to provide a commanded gimbal angle signal;

a summing device having one input coupled to the proportional plus integration compensation circuit and a second input coupled to the resolver control loop for combining the commanded gimbal angle signal and the measured gimbal angle signal to produce a gimbal angle error angle signal in response thereto; and a compensation circuit coupled to the summing device for processing the gimbal angle error angle signal to provide a filtered gimbal angle error angle signal to stabilize gimbal dynamics; and a step generator coupled to the compensation circuit for processing the compensated gimbal angle error angle signal to produce step commands that are coupled to the gimbal drive circuit.

12. The gimbal control system of claim 11 which further comprises:

switching circuitry coupled between the proportional plus integration compensation circuit and the summing device for providing a predetermined number of control modes for controlling the gimbal.

13. The gimbal control system of claim 11 herein the gimbal comprises a stepper drive gimbal and the compensation circuit comprises a proportional-double-integrator-derivative compensation circuit.

14. The gimbal control system of claim 13 which further comprises a notch filter coupled between the proportional-double-integrator-derivative compensation circuit and the step generator.

15. The gimbal control system of claim 13 wherein the notch filter further comprises a roll-off filter.

16. The gimbal control system of claim 11 wherein the gimbal comprises a direct drive gimbal comprising drive electronics that generates a gimbal torque signal coupled to the gimbal drive, and wherein the compensation circuit comprises a proportional-integrator-derivative compensation circuit.

17. The gimbal control system of claim 16 which further comprises a notch filter coupled between the proportional-integrator-derivative compensation circuit and the drive electronics.

18. A gimbal system comprising:

a gimbal;

an antenna disposed on the gimbal;

a control processor coupled to the gimbal for generating control signals to position the antenna;

a resolver and a derivative-type processing circuit disposed in an inner feedback loop that is coupled to the gimbal, and wherein the resolver provides resolver signals that are processed by the derivative-type processing circuit and are fed back to the gimbal to stabilize the gimbal and correct for gimbal flexibility; and an outer feedback loop that comprises an autotrack receiver for providing signals indicative of the absolute line-of-sight of the antenna, which signals provide corrections to a command profile of the inner loop.

\* \* \* \* \*